Aug. 27, 1935.   R. W. GEMMELL   2,012,425
CONTROL SYSTEM
Filed March 29, 1934
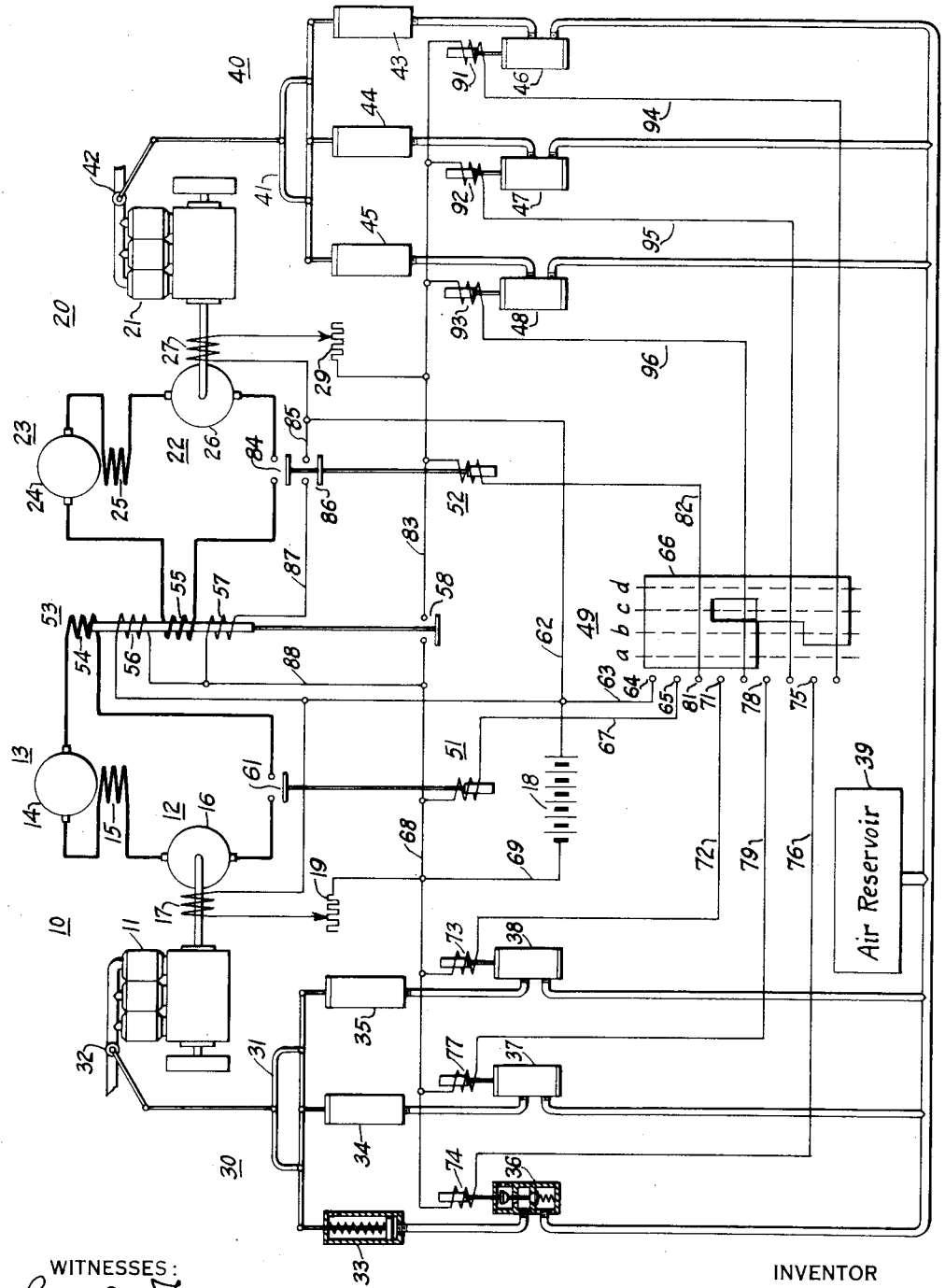
WITNESSES:
Leon J. Jaza
INVENTOR
Robert W. Gemmell.
BY
ATTORNEY Patented Aug. 27, 1935

2,012,425

UNITED STATES PATENT OFFICE 2,012,425

CONTROL SYSTEM

Robert W. Gemmell, Pittsburgh, Pa., assignor to Westinghouse Electric & Manufacturing Company, East Pittsburgh, Pa., a corporation of Pennsylvania Application March 29, 1934, Serial No. 718,093

7 Claims. (Cl. 290—4)

My invention relates, generally, to control systems and more particularly, to systems for controlling the operation of self-propelled locomotives or other vehicles.

In order to perform certain kinds of work, as, for example, switching operations, it may be desirable to equip self-propelled locomotives, or other vehicles, of the gas or Diesel-electric type, with two complete and independent power units, each of which includes an internal-combustion engine, a generator and one or more propelling motors. One of the power units may have sufficient capacity to propel the locomotive and haul light loads, thereby making it necessary to utilize the other unit only for hauling heavy loads. Considerable fuel and also wear on the mechanical parts of the power units may be saved by utilizing the second power unit only when the load on the locomotive is above the normal capacity of the first power unit.

An object of my invention, generally stated, is to provide a system for controlling the operation of self-propelled vehicles which shall be simple and efficient in operation and which may be economically manufactured and installed.

A more specific object of my invention is to provide for automatically controlling the operation of the power units of a self-propelled vehicle in accordance with the load thereon.

A further object of my invention is to cause certain of the power units of a self-propelled vehicle to develop power only when the load thereon exceeds a predetermined amount.

Other objects of my invention will be either explained fully hereinafter, or will be apparent to those skilled in the art.

In accordance with one embodiment of my invention, a relay which is responsive to the load on the power units of a self-propelled locomotive having a plurality of power units is so connected in the power system that one or more of the units is caused to develop power when the load on the other unit or units increases to a predetermined value, and is caused to run at idling speed, or be completely shut down, when the load decreases to a predetermined value.

For a fuller understanding of the nature and objects of my invention, reference may be had to the following detailed description, taken in conjunction with the accompanying drawing in which the single figure is a diagrammatic view of a locomotive control system embodying my invention.

Referring to the drawing, I have illustrated a power system having two power units 10 and 20, suitable for developing power for operating a self-propelled locomotive (not shown). In order to simplify the drawing and the description, I have shown a system having only two power units. However, it will be readily understood that more than two units may be utilized if desired. The power unit 10 comprises an internal-combustion engine 11, which drives a generator 12. The generator 12 supplies current for operating a motor 13, which may be of a type suitable for propelling the locomotive. The motor 13 is provided with an armature winding 14 and a series field winding 15. The generator 12 is provided with an armature winding 16 and a field winding 17, which may be excited from a battery 18. The field current may be controlled by means of a variable rheostat 19, connected in the field-winding circuit.

The power unit 20 comprises an engine 21, a generator 22 and a motor 23, similar to those in the power unit 10. The motor 23 is provided with an armature winding 24 and a series field winding 25. The generator 22 is provided with an armature winding 26 and a field winding 27, which is also excited from the battery 18 through a rheostat 29.

The fuel supplied to the engines 11 and 21 is controlled by electro-pneumatic throttle-actuating mechanisms 30 and 40, respectively, which may be of the type described in United States Patent No. 1,795,896, issued March 10, 1931, to Samuel B. Schenck, and assigned to the Westinghouse Electric & Manufacturing Company.

Inasmuch as the throttle-actuating mechanisms are fully described in the foregoing patent, it is believed to be unnecessary to describe them in detail in this application. Briefly, the mechanism 30 consists of a linkage 31, disposed to operate a throttle 32 to control the fuel supplied to the engine 11. The linkage 31 is actuated step-by-step by three pistons disposed in air cylinders 33, 34 and 35. The admission of air to the cylinders 33, 34 and 35 is controlled by electromagnetically operated valves 36, 37 and 38, respectively. The air for operating the pistons may be supplied from an air reservoir 39, which may be fed from any suitable source of compressed air, such as an air compressor (not shown).

The mechanism 40 is similar to the mechanism 30 and consists of a linkage 41, for operating a throttle 42, three air cylinders 43, 44 and 45, and electromagnetically operated valves 46, 47 and 48 for controlling the admission of air from the reservoir 39 to the air cylinders 43, 44 and 45, respectively.

A manually operable controller 49 is provided for controlling the energization of the magnet valves 36, 37 and 38 of the throttle-actuating mechanism 30 in sequential relation, thereby causing the throttle 32 to be operated step-by-step in a manner fully described in the aforementioned patent to Schenck. The controller 49 also controls the energization of the magnet valves 46, 47 and 48 and the operation of the throttle 42 under predetermined conditions of load, as will be more fully described hereinafter.

Electrically operated switches 51 and 52, which are controlled by the controller 49, are provided for connecting the generators 12 and 22 to the motors 13 and 23, respectively. As will be described hereinafter, the generator 22 is connected to the motor 23 to furnish power for propelling the locomotive only when the load on the generator 12 and the motor 13 exceeds a predetermined value.

In order that the operation of the power unit 20 may be controlled in accordance with the load on the locomotive, a relay 53 is provided for controlling the operation of the throttle-actuating mechanism 40 and the switch 52, thereby controlling the operation of the engine 21 and the motor 23. The relay 53 may be of any type which will be responsive to the load imposed on the locomotive. In the illustrated embodiment of the invention, the relay 53 is provided with two current coils 54 and 55, the coil 54 is connected in series-circuit relation with the generator 12 and the motor 13, and the coil 55 is connected in series-circuit relation with the generator 22 and the motor 23. The relay 53 is also provided with a stabilizing shunt coil 56 which is connected across the battery 18. The three coils 54, 55 and 56 are so connected that, when energized, they produce magnetic forces which act in the same direction to close the contact members of the relay. An additional shunt coil 57 is also provided on the relay which opposes the action of the other three coils. The coil 57 is connected across the battery 18 when the switch 52 is closed to connect the motor 23 to the generator 22, or, in other words, when the power unit 20 is brought into operation.

The relay 53 is provided with contact members 58 which are so connected in the control system that the actuating coils of the magnet valves 46, 47 and 48, and also the switch 52 are energized when the contact members 58 are closed, thereby operating the throttle-actuating mechanism 40 to open the throttle 42 of the engine 21 and closing the switch 52 to connect the motor 23 to the generator 22.

In this manner, the relay 53, which is responsive to the load on the locomotive, controls the operation of the power unit 20. As long as the load is within the normal capacity of the power unit 10, the motor 23 is not connected to the generator 22 and the engine 21 operates at idling speed. However, if the current in the coil 54, which is directly proportional to the load on the power unit 10, exceeds a predetermined value, the relay 53 will be actuated to cause the switch 52 to close and the throttle-actuating mechanism 40 to open the throttle 42 thereby increasing the speed of the engine 21 which produces power to assist in propelling the locomotive.

As soon as the load on the locomotive decreases to a point at which the current in the coils 54 and 55 of the relay 53 is below a predetermined value, the relay will drop to its lowermost position and the power unit 20 will be cut out of service, as hereinafter described in detail.

In order that the functioning of the apparatus may be more clearly understood, the operation of the system will now be described.

Assuming that the engines 11 and 21 have been started in a manner well known in the art and are operating at the idling speed, the motor 13 may be connected to the generator 12 to propel the locomotive by actuating the controller 49 to position "a", thereby establishing an energizing circuit for the actuating coil of the switch 51 to close the contact members 61 of the switch. This circuit may be traced from the positive terminal of the battery 18, through conductors 62 and 63, contact members 64 and 65 bridged by the contact segment 66 of the controller 49, conductor 67, the actuating coil of the switch 51, and conductors 68 and 69 to the negative terminal of the battery 18.

When the controller 49 is actuated to position "a", the actuating coil of the magnet valve 38 is also energized through a circuit which extends from a contact member 71, which engages the contact segment 66, through conductor 72, the actuating coil 73 of the magnet valve 38 and conductors 68 and 69 to the negative terminal of the battery 18. As fully described in the foregoing patent to Schenck, the throttle 32 is opened one notch when the coil 73 of the magnet valve 38 is energized, thereby increasing the supply of fuel to the engine 11 and speeding up the engine.

The throttle 32 may be opened further by moving the controller 49 to position "b" to energize the actuating coil 74 of the magnet valve 36 through a circuit which extends from a contact finger 75, which engages the contact segment 66, through conductor 76, the coil 74 and conductors 68 and 69 to the negative terminal of the battery 18.

The speed of the engine may be still further increased by actuating the controller 49 to position "c" to energize the coil 77 of the magnet valve 37. The energizing circuit may be traced from a contact finger 78, which engages the contact segment 66, through conductor 79, the coil 77 and conductors 68 and 69 to the battery 18. It will be noted that the coil 73 of the magnet valve 38 is deenergized when the controller 49 is moved to position "c" to energize the coil 77 of the magnet valve 37, in accordance with the method of operation of the throttle-actuating mechanism 30 described in the above-noted patent to Schenck. The maximum speed of the engine 11 is obtained by moving the controller 49 to position "d" to again energize the coil 73 of the magnet valve 38, thereby actuating the throttle 32 to its maximum opening.

In the event that the load on the locomotive exceeds the normal capacity of the power unit 10, in which case the current in the coil 54 will exceed a predetermined value, the relay 53 is raised to its uppermost position by the combined action of the coils 54 and 56, thereby closing the contact members 58 of the relay 53.

As previously stated, the actuating coil of the switch 52 is energized when the contact members of the relay 53 are closed. The energizing circuit may be traced from a contact finger 81, which engages the contact segment 66, through conductor 82, the actuating coil of the switch 52, conductor 83, contact members 58 of the relay 53, and conductors 68 and 69 to the negative terminal of the battery 18.

The closing of the switch 52 connects the motor 23 to the generator 22 through the contact members 84 of the switch 52, and also connects the coil 57 of the relay 53 across the battery 18 through a circuit which extends from conductor 62, through conductor 85, contact members 86 of the switch 52, conductor 87, the coil 57, and conductors 88, 68 and 69 to the negative terminal of the battery 18.

As described hereinbefore, the coil 57 is so disposed on the relay 53 that it opposes the action of the other shunt coil 56 and the series coils 54 and 55. By properly designing the coils on the relay 53, the relay may be caused to respond to the load currents in the motors 13 and 23 without any "hunting" action, the function of the coils 56 and 57 being to reduce the "hunting" action and to permit adjustments for desired "pull-in" and "drop-out" values of the relay.

When the contact members 58 of the relay 53 are closed, the actuating coils 91, 92 and 93 of the respective magnet valves 46, 47 and 48 are energized through conductors 94, 95 and 96, respectively, in accordance with the position of the controller 49. It will thus be seen that the throttle-actuating mechanism 40 will be operated to a position corresponding to that of the throttle mechanism 30, thereby causing the engine 21 to operate at the same speed as the engine 11, and the power unit 20 to assume the same load, or approximately the same, as the power unit 10. The two engines 11 and 21 may be simultaneously controlled by means of the controller 49 in the manner previously described, the speed of both engines being decreased or increased by operating the control drum of the controller to the position corresponding to the desired speed.

When the load on the locomotive, and consequently the current in the coils 54 and 55 of the relay 53, decreases to a predetermined value, the relay will drop to its lowermost position, thereby denergizing the actuating coils of the switch 52 and the magnet valves of the throttle mechanism 40, which disconnects the motor 23 from the generator 22 and reduces the speed of the engine 21 to its idling speed, or the engine 21 may be stopped if desired, in which event it would be again restarted, upon the operation of the relay 53, by cranking the engine 21 from the battery 18, in a manner well known in the art.

However, the engine 11 will continue to operate at a speed corresponding to the position of the controller 49, the operation of the relay 53 in no way affecting the control of the power unit 10. If it is desired to stop the locomotive and reduce both engines to their idling speeds, the controller 49 may be moved to the off position, as shown in the drawing.

From the foregoing description, it will be apparent that I have provided a system for controlling the operation of a self-propelled vehicle, equipped with two or more complete power units, which will effect a considerable saving in the amount of fuel required to operate the vehicle when it is utilized to perform operations of a certain type. The wear on the mechanical equipment of the locomotive is also considerably reduced, since only one power unit is utilized when the locomotive is hauling light loads, the other power unit being also utilized only for heavy or peak loads.

I do not desire to be restricted to the specific embodiment of my invention herein shown and described, since it is evident that it may be changed and modified without departing from the spirit and scope of my invention as defined in the appended claims.

I claim as my invention:

1. In a control system, in combination, a power unit for propelling a vehicle, means for controlling the power developed by the power unit, a second power unit, means for controlling the power developed by the second unit, a common control means for controlling the setting of both of said power controlling means, and means responsive to the load on the first power unit and cooperating with the common control means to control the operation of the second unit.

2. In a control system, in combination, a power unit for propelling a vehicle, means for controlling the power developed by the power unit, a second power unit, means for controlling the power developed by the second unit, a common control means for controlling the position of both of said power controlling means and relay means responsive to the load on the first power unit and cooperating with the common control means to control the operation of the power controlling means for the second power unit.

3. In a control system, in combination, a power unit for propelling a vehicle, means for controlling the fuel supplied to the power unit to control the power developed by the unit, a second power unit, means for controlling the fuel supplied to the second power unit, a controller for controlling the operation of the fuel controlling means, and relay means responsive to the load on the first power unit and cooperating with the controller to control the operation of the second power unit.

4. In a control system, in combination, a power unit comprising an internal-combustion engine, a generator and a motor for propelling the locomotive, a throttle-actuating mechanism for controlling the fuel supplied to the engine, a second power unit similar to the first unit, a throttle-actuating mechanism for controlling the fuel supplied to the second unit, a controller for controlling the operation of both of said throttle-actuating mechanisms, and means responsive to the load on the first power unit and cooperating with the controller to control the operation of the second power unit.

5. In a control system, in combination, two power units, each unit comprising a motor, a generator and an internal-combustion engine, a throttle-actuating mechanism for controlling the fuel supplied to each engine, control means for controlling the operation of the throttle-actuating mechanisms, and means responsive to the load on one of the power units and cooperating with said control means to control the operation of the other unit.

6. In a control system, in combination, two power units, each unit comprising a motor, a generator and an internal-combustion engine, a throttle-actuating mechanism for controlling the fuel supplied to each engine, a controller for controlling the operation of both throttle-actuating mechanisms, and relay means responsive to the current traversing the motor of one power unit and cooperating with the controller to control the operation of the other unit.

7. In a locomotive control system, in combination, a power unit for normally propelling the locomotive, a second power unit, each unit comprising a motor, a generator and an internal-combustion engine for driving the generator, a throttle-actuating mechanism for controlling the fuel supplied to each engine, a controller for controlling the operation of the throttle-actuating mechanisms, and a relay having an actuating coil energized by the load current in each of the motors and cooperating with the controller to control the operation of the second power unit.

ROBERT W. GEMMELL.